Figure 1:
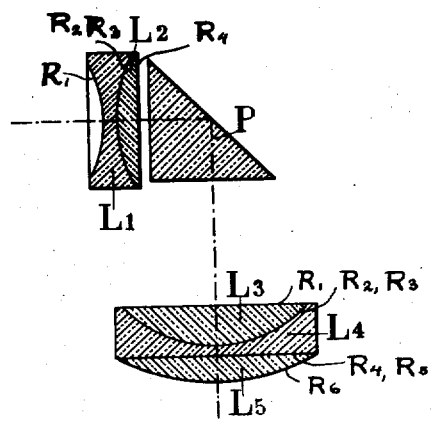

C. H. FLORIAN.
OBJECTIVE FOR OPTICAL APPARATUS.
APPLICATION FILED MAR. 25, 1913.

1,145,132.

Patented July 6, 1915.

UNITED STATES PATENT OFFICE.

CHARLES HENRI FLORIAN, OF PARIS, FRANCE, ASSIGNOR TO SOCIÉTÉ ANONYME DES ETABLISSEMENTS LACOUR-BERTHIOT, OF PARIS, FRANCE.

OBJECTIVE FOR OPTICAL APPARATUS.

1,145,132.   Specification of Letters Patent.   Patented July 6, 1915.

Application filed March 25, 1913.   Serial No. 756,739.

*To all whom it may concern:*

Be it known that I, CHARLES HENRI FLORIAN, of 9 Rue Froissart, in the city of Paris, Republic of France, have invented Improvements in Objectives for Optical Apparatus, of which the following is a full, clear, and exact description.

The present invention relates to an objective for optical apparatus intended to form an image which is then taken up and transferred by one or more collecting lenses.

The object of the invention is to obtain, after these transfers a plane image notwithstanding the deformation produced by the collecting lenses.

The invention is characterized broadly by the fact that the objective is constituted in such a manner as to give a curved image the convexity of which is directed toward the origin of the light, that is to say in the opposite direction to the curvature which is then produced by the field lenses and the collecting lenses which transfer the image. It follows that the initial deformation produced by the objective and the subsequent deformations caused by the field lenses and the various collecting lenses are corrected and that the final image is plane. The objective by means of which this result can be obtained is characterized broadly by the combination of a front divergent system and a rear convergent system, the focal lengths of which are substantially equal and which are separated by an interval which is itself substantially equal to the common focal distance. The aperture of the objective is substantially equal to one twelfth of the focal length of the field and is approximately 50°.

The imaginary diaphragm of the apparatus, that is to say the common base of the incident light cylinders is located between the front divergent system and the rear convergent system at a distance from the front divergent system equal to $\frac{2}{10}$ths. of the common focal length. The real diaphragm, that is to say the common base of the light cones issuing from the divergent system, is also located between the two systems at a distance from the front divergent system equal to $\frac{1}{4}$th. the common focal length.

With this arrangement of the novel objective the inclination of the emergent pencils is small. It follows that if the axes of these pencils are subsequently to be concentrated by a field lens at the center of a collecting lens intended to transfer the image, the convergence of this field lens will be small and, consequently, will only attenuate to a small extent the convexity toward the origin of the light of the image furnished by the objective. The novel objective is also corrected of chromatism and astigmatism for a luminous pencil inclined to the axis at the origin by an angle equal to $\frac{4}{5}$ths. of the half field. These general results of the novel objective arise, generally speaking, from the choice of the lenses and of the curvatures, but this choice is facilitated and the results are obtained with greater certainty with the combination of the optical elements forming the object of the invention.

For certain special applications in which it is desirable to obtain an instrument of the maximum possible length this objective also presents the advantage of furnishing between the front divergent system and the image, a distance equal to three times the focal distance.

This novel objective is applicable in all cases in which it may be useful to obtain an image presenting a curvature the convexity of which is directed toward the origin of the light. It is thus applicable to terrestrial telescopes having a wide field.

It is applicable to periscopes in which the field lenses and the collecting lenses produce a curvature of the image which is compensated for by the inverse initial curvature produced by the objective.

It is applicable to certain measuring instruments in which it may be useful to project an image upon a spherical surface or upon a scale drawn in accordance with the generating lines of a cylinder of small height.

In the case of the periscope:

(1) The astigmatism may be corrected as desired as in the example hereinafter given, or it may be retained in the desired proportion according as the astigmatism introduced by the assemblage of successive collecting lenses and field lenses is canceled or corrected, or if this astigmatism still exists it is desirable to correct it by imparting the proper astigmatism to the objective. This result is obtainable by giving to the front divergent system the special form shown on Figure II, the curvature of the image being accentuated thereby.

(2) The chromatism being corrected for a point of the axis from which the red and green images are seen in conicidence after the first field lens, the first collecting lens is placed at this point of the axis. This collecting lens, as it allows the alinement of the images relatively to its center to persist, is readily able, by means of a suitable chromatic correction to furnish subsequently perfectly superposed images. The red and green images can also be caused to coincide immediately after the objective as in the first example hereinafter given.

Generally speaking, the lenses of the objective should satisfy the following relationship:

$$2\frac{da}{a}\left(1+\frac{x}{D}\right)=\frac{db}{D}+d\lambda\left(\frac{1}{a}+\frac{1}{D}\right)$$

in which:

$a=$ the focal length of the convergent system.

$b=$ the focal length of the divergent system.

$1=$ the lengths of lens interposed.

$$\lambda = \Sigma\left(\frac{1}{n}\right)$$

$da$; $db$; $d\lambda=$ variations of $a$, $b$ $\lambda$ between the radiations to be compensated.

$x=$ the distance from the image to the convergent system.

$D=$ the distance from the image to the point in the axis from which the red and green images are seen in coincidence.

In assuming (as is very nearly the case) that:

$$a = b = E = \frac{x}{2}$$

E being the distance from the convergent system to the divergent system.

When the objective is to be followed by a field lens coinciding with the image and not corrected, or else separated from the image and corrected, D is in particular the distance from the point at which the axes of the luminous pencils which emerge from the rear convergent system unite, and consequently equal in the present example, to at least five times the common focal distance. Furthermore if the following relation is established:

$$4da = db + d\lambda$$

that is to say $$2da = db = d\lambda$$

the correction is absolute immediately after the objective subject to the displacement of the nodal points in thick lenses. This permits of giving D any desired value and this condition is satisfied by the example given below and corresponding to Fig. 1.

Figure 2:
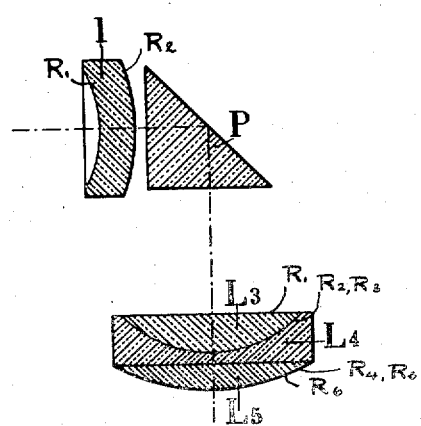

When, by reason of its advantages of simplicity the arrangement illustrated in Fig. 2 (the second example) is employed, even with an uncorrected field lens separated from the image, the self dispersion of this field lens and its separation are connected by the following relationship that should be observed in order to maintain the alinement of the images relatively to the center of the first collecting lens $$(db-d\lambda)\frac{D_o - D}{D + 2a}+\delta(D_o - \delta)d\left(\frac{1}{c}\right)=0$$

in which: $D_o$ is the distance to the image of the point at which the axes of the pencils emerging from the rear convergent system of the objective unit (that is to say 5F as stated above). D is the distance to the image of the point of the axis from which the green and red images are seen in coincidence as results from the first relationship and consequently from the constitution of the objective. $c$ is the focal distance of the field lens employed for bringing the pencils back onto the collecting lens. $\delta$ is the distance at which this field lens is located from the image and beyond this image.

It should be noted that this relationship could also be expressed in the following way:

$$\frac{1}{a}(2da-d\lambda)+\frac{1}{D_o}(4da-db-d\lambda)+\delta\left(1-\frac{\delta}{D_o}\right)\left(\frac{1}{c}\right)=0$$

It will be noted that, having selected the dispersion $$d\left(\frac{1}{c}\right)$$

of this field lens, its position is determined; on the contrary, when its position is determined, its dispersion is also determined. These latter considerations define generally the method of employing the novel objective when it is to be accompanied by a field lens which is the case with terrestrial telescopes and periscopes.

For the sake of clearness the accompanying drawing (which is given by way of example only) represents diagrammatically the objective forming the object of the invention, intended for a periscope.

The front divergent system is formed of two lenses L' and L² arranged in contact (Fig. 1). Behind this system is arranged a total reflection prism P. The rear convergent system is formed of three lenses L³, L⁴, L⁵.

In this example, the dimensions are as follows:

Divergent $\begin{cases} L_1 R_1 = 25 & R_2 = 31.1 & e_1 = 3 & n_d = 1.5102 & \nu = 64.3 \\ L_2 R_3 = 31.1 & R_4 = \infty & e_2 = 4.5 & n_d = 1.613 & \nu = 37.1 \end{cases}$ Air gap: $e = 2$
Prism: $e' = 25$
Air gap: $e^2 = 26.1$ Convergent $\begin{cases} L_3 R_1 = 470 & R_2 = 23.2 & e_3 = 7.7 & n_d = 1.5890 & \nu = 60.8 \\ L_4 R_3 = 23.2 & R_4 = 470 & e_4 = 4.2 & n_d = 1.6129 & \nu = 36.9 \\ L_5 R_5 = 470 & R_6 = 38.3 & e_5 = 6.8 & n_d = 1.6129 & \nu = 58.3 \end{cases}$ It should here be noted that the selection of the glasses of the lenses L⁴ and L⁵ with the same indices or with indices very approximately the same but with different dispersive powers, permits, without in any way affecting the geometrical results furnished by the objective as regards the curvature of the image, the astigmatism and the focal distance, of varying the curvature ($R_4 = R_5$) of the surface common to the two lenses L⁴ and L⁵ and consequently of obtaining simply, without further experiments, the value of $da$, which, in accordance with the relations established above, would suit particular cases different from that which forms the object of the example given above. These special cases may present themselves either because the glasses of different successive batches are not absolutely identical, or because in a given application, it may be desirable to modify the length of the lens interposed between the two systems (increase, diminution or elimination of the intermediate prism).

The choice of the lenses, the result of which is to cause $da$ to vary at will, without modifying the other magnitudes, permits of coping with accidental or designed variations of $db$ and $d\lambda$.

Instead of constituting the front divergent system as stated, it is possible, provided the relations indicated above are satisfied, to constitute it by a single lens of small dispersion, the concavity of which is always directed toward the origin of the light. This arrangement has been represented diagrammatically Fig. 2 which shows a single lens $l$ of special form arranged in front of the prism P.

The data are the same as those of the first example except as regards the divergent system. This is cut in a crown of small dispersion.

$$n = 1.50 \text{ to } 1.52$$
$$\nu = 65 \text{ to } 58$$

The curvatures will vary slightly with the batch selected. For example, the following may obtain:

$$R' = 25.2 \quad R_2 = 166.7 \quad e' = 7.5 \quad n_d 1.5102 \quad \nu = 64.3$$

In this case, the colored images are merely alined and it is not necessary to take them into account in correcting the first collecting lenses and in determining the first field lens, as stated above.

The arrangements described above are given by way of example only; the forms of the apparatus, the dimensions and detail arrangements may of course vary in all cases without affecting the principle of the invention.

What I claim and desire to secure by Letters Patent of the United States is:—

1. A lens adapted to give a curved image the convexity of which is turned toward the source of light, comprising a divergent lens and a convergent lens, each of which is adjusted to counteract spherical and chromatic aberration, the lenses having substantially the same focal length, and being separated by a distance substantially equal to such focal length.

2. A lens adapted to give a curved image the convexity of which is turned toward the source of light comprising a complex divergent lens composed of two elements one bi-concave and the other convex in at least one direction, the material of the bi-concave lens being of lower refracting power than that of the other lens, a triplex lens formed of two bi-convex elements and an interposed bi-concave element, the index of refraction of one of the bi-convex elements being less than that of the other elements, the complex lens and the triplex lens having substantially the same focal length and being separated by a distance substantially equal to such focal length.

The foregoing specification of my improvements in objectives for optical apparatus signed by me this 14th day of March, 1913.

CHARLES HENRI FLORIAN.

Witnesses:
LUCIEN MEMMINGER,
RENÉ THIRIOT.